(12) United States Patent
Nguyen et al.

(10) Patent No.: US 6,879,682 B1
(45) Date of Patent: Apr. 12, 2005

(54) AIN TO ISDN MESSAGE MAPPING FOR INTELLIGENT PERIPHERAL SERVICE ENHANCEMENT

(75) Inventors: Hong T Nguyen, Atlanta, GA (US); Anita Hogans Simpson, Decatur, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 369 days.

(21) Appl. No.: 10/255,220

(22) Filed: Sep. 26, 2002

(51) Int. Cl.[7] .............................. H04M 7/00; H04J 3/16
(52) U.S. Cl. .................. 379/230; 379/221.08; 370/466
(58) Field of Search ........................... 379/219, 220.01, 379/221.08, 221.09, 221.1, 221.11, 221.12, 229, 230, 207.02; 370/466, 467

(56) References Cited

U.S. PATENT DOCUMENTS

| | | | | |
|---|---|---|---|---|
| 5,572,583 A | * | 11/1996 | Wheeler et al. | 379/221.09 |
| 5,732,130 A | * | 3/1998 | Iapalucci et al. | 379/221.12 |
| 5,933,490 A | * | 8/1999 | White et al. | 379/221.01 |
| 6,055,302 A | * | 4/2000 | Schmersel et al. | 379/201.01 |

* cited by examiner

Primary Examiner—Benny Tieu
(74) Attorney, Agent, or Firm—Merchant & Gould

(57) ABSTRACT

Data is mapped between an advanced intelligent network (AIN) protocol message and an integrated services digital network (ISDN) protocol message for use by an intelligent network telecommunications system components. At a service control point, an AIN message is populated in an AIN protocol format with data required for providing a call handling service. The AIN message is routed to a switch associated with a service node. At the switch associated with the service node, an ISDN message is populated according to an ISDN protocol format with the data from the AIN message. If any data from any data field of the AIN message does not correspond to a matching data field of the ISDN message, a data field of the ISDN message is selected for populating with any data that does not correspond to a matching data field of the ISDN message. The ISDN message is routed to the service node that extracts the data from each data field of the ISDN message for providing the call handling service. The service node parses the data extracted from the selected data field according to a set of instructions to determine an identification of the data populated in the selected data field for using the data for providing the call handling service. Data from an ISDN message may likewise be mapped to an AIN message for use by an AIN component such as a service control point.

40 Claims, 6 Drawing Sheets

AIN TO ISDN MESSAGE MAPPING FOR INTELLIGENT PERIPHERAL SERVICE ENHANCEMENT

FIELD OF THE INVENTION

This invention relates generally to methods and systems for mapping data from an advanced intelligent network (AIN) protocol message to an integrated services digital network (ISDN) protocol message for use by an intelligent peripheral telecommunications system component.

BACKGROUND OF THE INVENTION

The public switch telephone network that evolved in the 1980s incorporated the Advanced Intelligent Network (AIN). The Advanced Intelligent Network uses the Signaling System 7 (SS7) network for signal or system control message transport between components of the advanced intelligent network. A typical architecture of the Advanced Intelligent Network includes a variety of central offices, including service switching points for processing voice and data transmissions to and from a variety of customer premises equipment, such as telephones and computers. In order to provide advanced telecommunications services, a variety of other components are included in the Advanced Intelligent Network, including service control points. Among other things, service control points maintain databases of subscriber data and instructions for routing voice and data transmissions and for directing subscriber data to other network components for providing advanced telecommunications features to subscribers.

The modern Advanced Intelligent Network also includes intelligent peripheral components including service nodes. Service nodes are used by telecommunications service providers for providing a variety of specialized features including text-to-speech conversion and a variety of specialized services, for example, Call Monitoring and Call Return With Calling Name. Service nodes are also commonly used for obtaining input from subscribers by providing a caller with interactive voice prompts and recorded announcements.

Service nodes typically are connected to the Advanced Intelligent Network via integrated services digital network (ISDN) lines through which data is transported to and from service nodes. Service nodes are typically connected to an Advanced Intelligent Network via a servicing switching center or central office. When a call is received at a switch requiring some specialized feature or processing from a service node, a trigger is typically fired at the switching center or central office launching a query to a service control point. At the service control point, all data required for providing the specialized service is routed to a switch associated with a service node tasked with providing the specialized feature or service.

The data from the service control point is routed to the service node switch via the SS7 signaling system via an AIN protocol. At the service node switch, the switch maps the AIN message data from the service control point to an ISDN protocol message for routing the data to the service node. Because the AIN message and the ISDN message do not precisely map to each other on a data field by data field basis, the AIN message often has data needed by the service node, but for which no matching data field is available in the ISDN protocol message. For example, the AIN message may contain multiple telephone directory numbers required by the service node for providing a specialized calling handling feature. If the ISDN protocol message does not have data fields for populating with the multiple telephone directory numbers, those numbers may be dropped by the switch and are not sent to the service node in the ISDN protocol message. Thus, the service node is required to query the service control point again for data that was dropped or ignored by the switch in order for the service node to provide the specialized service or feature. That is, for each item of data required by the service node, but not received by the service node, the service node must query the service control point as many times as is necessary until the service node receives all data required for providing the specialized service or feature.

It is with respect to these and other considerations that the present invention has been made.

SUMMARY OF THE INVENTION

In accordance with embodiments of the present invention, the above and other problems are solved by methods and systems for mapping data between a Signaling System 7 (SS7) Advanced Intelligent Network (AIN) protocol message and an ISDN protocol message for use by an intelligent communications network component.

According to embodiments of the invention, a call is received at a switch requiring some special service or feature. For example, the called party's line may be provisioned with a feature such as Call Monitoring or Call Return With Calling Name. At the switch, a trigger is fired launching a query to a first network component, such as a service control point. The first network component obtains all data required for the feature, such as a calling party directory number, a called party directory number, a voice mail access directory number, etc. The first network component populates an AIN protocol message with the required data and dispatches the message to a switch that services a second network component, such as a service node, that is tasked with providing the special service or feature.

At the second switch, the data from the first network component is mapped to corresponding entries in an ISDN protocol message for routing the data to the service node. An attempt is first made to map data into directly corresponding data fields. For example, a calling party name on the AIN protocol message is mapped directly to a calling party name field in the ISDN protocol message. For any data that does not directly map from the AIN message to the ISDN message, an attempt is made to map data to the closest data field in the ISDN message. For example, if the AIN message includes a data field allowing up to 15 characters of text to provide data associated with data display and the ISDN message has a similar data field allowing up to 20 characters of text for data corresponding to a display field, an attempt is made to map the data from the display field from the AIN message to the display field of the ISDN protocol message. Any remaining data in the AIN message for which no corresponding data field exists in the ISDN message is populated by the switch into a generic or otherwise unused data field such as a user—user information data field.

Once the data is mapped from the AIN message to an ISDN protocol message, the ISDN message is sent from the switch to the service node. The service node extracts data from specific data fields recognized by the service node, and the service node parses any generic data fields according to a set of predefined instructions. According to one embodiment of the present invention, the service control point may instruct the switch servicing the service node to place data in a generic data field of the ISDN message according to a predefined order. That instruction may be passed to the service node so that the service node may parse data forwarded in the generic data field according to the predefined order in order to make use of the data contained therein. Once the service node has all required data from the service control point, the service node may provide the specialized service or feature associated with the data and associated with the call received at the first switch.

According to an alternative embodiment, the second network element may populate an ISDN message for transmission to the first network element. The ISDN message is received at a switch that, in turn, populates an AIN message with data from the ISDN message. Any data from the ISDN message that does not directly map to the AIN message is populated into a selected generic or otherwise unused data field of the AIN message. The AIN message is sent to the first network element. The first network element is populated with instructions for parsing data populated into the selected data field in order to utilize the data.

These and other features and advantages that characterize the present invention will be apparent from the following detailed description and a review of the associated drawings. It is to be understood that the foregoing general description and the following detailed description are exemplary and explanatory only and are not restrictive of the invention, as claimed.

DETAILED DESCRIPTION

The following description of embodiments of the present invention is made with reference to the above-described drawings wherein like numerals refer to like parts or components throughout the several figures. The present invention is directed to methods and systems for mapping data between an AIN protocol message and an ISDN protocol message for use by an intelligent telecommunications network component.

Operating Environment

Figure 1:
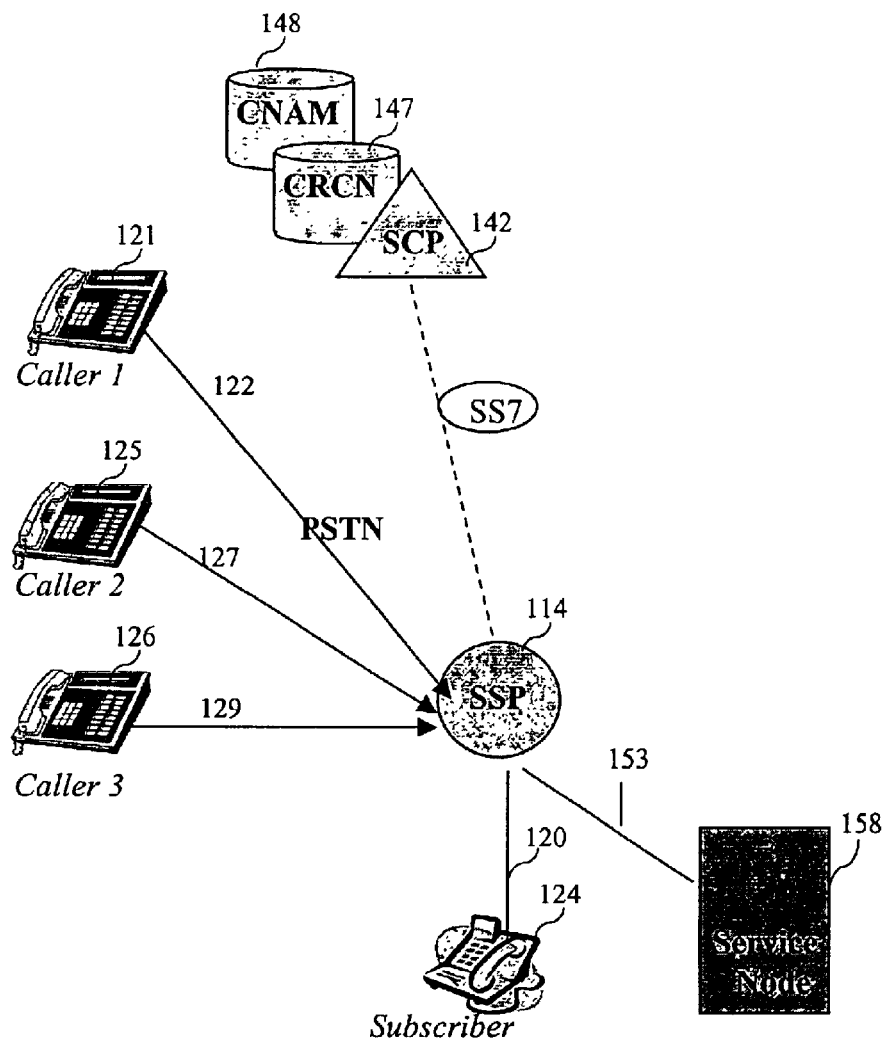
FIG. 1 is a simplified block diagram illustrating components of a telecommunications network that provides an operating environment for the present invention.

FIG. 1 is a simplified block diagram illustrating components of a telecommunications network that provides an operating environment for the present invention. The public switched telephone network 110 that evolved in the 1980s incorporated the Advanced Intelligent Network (AIN). Some of the components of the Advanced Intelligent Network are illustrated in FIG. 1. FIG. 1 is illustrative of at least a part of the Advanced Intelligent Network (AIN) of a typical local exchange carrier integrated with components of a wireless network 150. The Advanced Intelligent Network (AIN) uses the Signaling System 7 (SS7) network for signal or system control message transport. The components thereof are well known to those skilled in the art. The operation of many of the components of the Advanced Intelligent Network is also described in U.S. Pat. No. 5,245,719 to Weisser entitled "Mediation of Open Advanced Intelligent Network Interface by Shared Execution Environment" which is incorporated herein by reference. The SS7 communications protocol is provided in the document entitled "Bell Communications Research Specification of Signaling System 7," Document TR-NWT-000246, Issue 2 (June 1991), plus Revision 1 (December 1991), which is also incorporated herein by reference.

A plurality of central offices is provided in a typical public switched telephone network. As shown in FIG. 1, each central office may include an electronic switch known to those skilled in the art as a service switching point (SSP). These are indicated in FIG. 1 as SSP switches 114. The number of SSP switches depends on the number of subscribers to be served by the public switched telephone network. An SSP is the AIN component of a typical electronic central office switch used by a local exchange carrier. The terms "SSP" and "switch" are used interchangeably hereinafter and are understood to refer to a telecommunications switch having AIN capability and which may be utilized for connecting voice channel circuits, including voice and data channel lines.

As shown in FIG. 1, the switch (SSP) 114 has a plurality of subscriber lines 120, 122, 127 and 129 connected thereto. Each of the subscriber lines is connected to a terminating piece or pieces of customer premises equipment that are represented by telephones 121, 124, 125 and 126. SSP switches 114 are connected to other switches by a plurality of trunk circuits (not shown). These are the voice path trunks that interconnect the central offices 114 and over which calls are connected when completed.

Each piece of terminating equipment in the PSTN is preferably assigned a directory number. The term "directory number" is used herein in a manner consistent with its generally understood meaning of a number that is dialed or input by an originating party at an originating station to reach a terminating station associated with the directory number. A directory number, typically a ten digit number, is commonly referred to as a "telephone number" and may be assigned to a specific telephone line, such as the telephone line 120 shown in FIG. 1.

Much of the intelligence, and the basis for many of the enhanced features of the network, resides in the local service control point (SCP) 142. As is known to those skilled in the art, service control points, such as the SCP 142, are physically implemented by relatively powerful fault tolerant computers. Among the functions performed by the service control points is maintenance of network databases used in providing enhanced services. Service control points, such as SCP 142, normally implement high volume routing services, such as call forwarding and 800 number translation and routing. They are also used for maintenance of and providing access to high volume databases for authorization of billing, such as credit card number validations. In most local exchange carrier networks, service control points are only used for data base look up and routing services that take place prior to the logical completion of the call, i.e., the provision of a ringing signal to the called subscriber line and ring back to the calling subscriber.

The SCP 142 is also connected to a caller name (CNAM) database 148. The CNAM database comprises a plurality of directory numbers along with associated names for the directory numbers. The CNAM database may be used to provide a lookup database to provide caller names associated with calling party directory numbers in association with a caller identification service. The CNAM database may be comprised directory numbers from wireline customers as well as wireless customers of a wireless network. The SCP 142 is also shown connected to a Call Return With Calling Name (CRCN) database used for associating the telephone directory number and calling name of a last caller or a plurality of last callers to a particular subscriber directory number.

The modem Advanced Intelligent Network also includes service nodes (SN) 158. Those skilled in the art are familiar with service nodes, which are physically implemented by the same types of computers that embody the SCP 142. In addition to the computing capability and data base maintenance features, service nodes 158 use ISDN lines and may include DTMF signal recognition devices, tone generation devices, text to speech (TTS) voice synthesis devices and other voice or data resources. As shown in FIG. 1, the connection is through the SSP. For example, SN 158 is connected to SCP 142 via ISDN links 153 to SSP 114, ISDN/SS7 protocol conversion in SSP 114, and SS7 links. According to a preferred embodiment, the ISDN links 153 serve as a primary rate interface (PRI) or basic rate interface (BRI) over which services may be provided to subscribers.

As is appreciated by those skilled in the art, data transfer between components of the AIN via the SS7 signaling system is passed via AIN protocol messages. Data transfers between some components, such as between the switch 114 and the SN 158 is passed via ISDN protocol messages. Accordingly, in order to pass data from an AIN side component, such as the SCP 142, and an ISDN protocol component, such as the SN 158, a data message conversion takes place at the switch 114. The switch 114 maps data from an AIN protocol message to an ISDN protocol message for transport to the SN 158. Because the two separate message protocols do not map on a data field by data field basis, often data bound for a service node 158 is lost in the AIN/ISDN protocol conversion, as described below with reference to FIG. 2.

According to one embodiment of the present invention, the AIN protocol message is prepared according to the Transactional Capabilities Application Part (TCAP) protocol. As is known to those skilled in the art, the TCAP protocol provides the signaling function for network databases such as the SCP 142. TCAP is an SS7 application protocol. The TCAP protocol messages, such as the AIN message 200, are utilized for exchanging information between signaling nodes in a network, for example between two switches 114. The TCAP signaling also enables specialized services to access remote databases, such as the CNAM database 148 by the SCP 142. According to an embodiment of the present invention, AIN messages transmitted between the SCP 142 and the switch 114 are formatted according to a first message format, and the message format required between the switch 114 and the service node 158 is formatted according to a second ISDN protocol format. Accordingly, some data included in the AIN message from the SCP 142 to the switch 114 does not directly map on a one-to-one basis to corresponding data fields contained in the second message format, ISDN protocol message 240, populated by the switch 114 for transmission to the service node 158.

Figure 6:
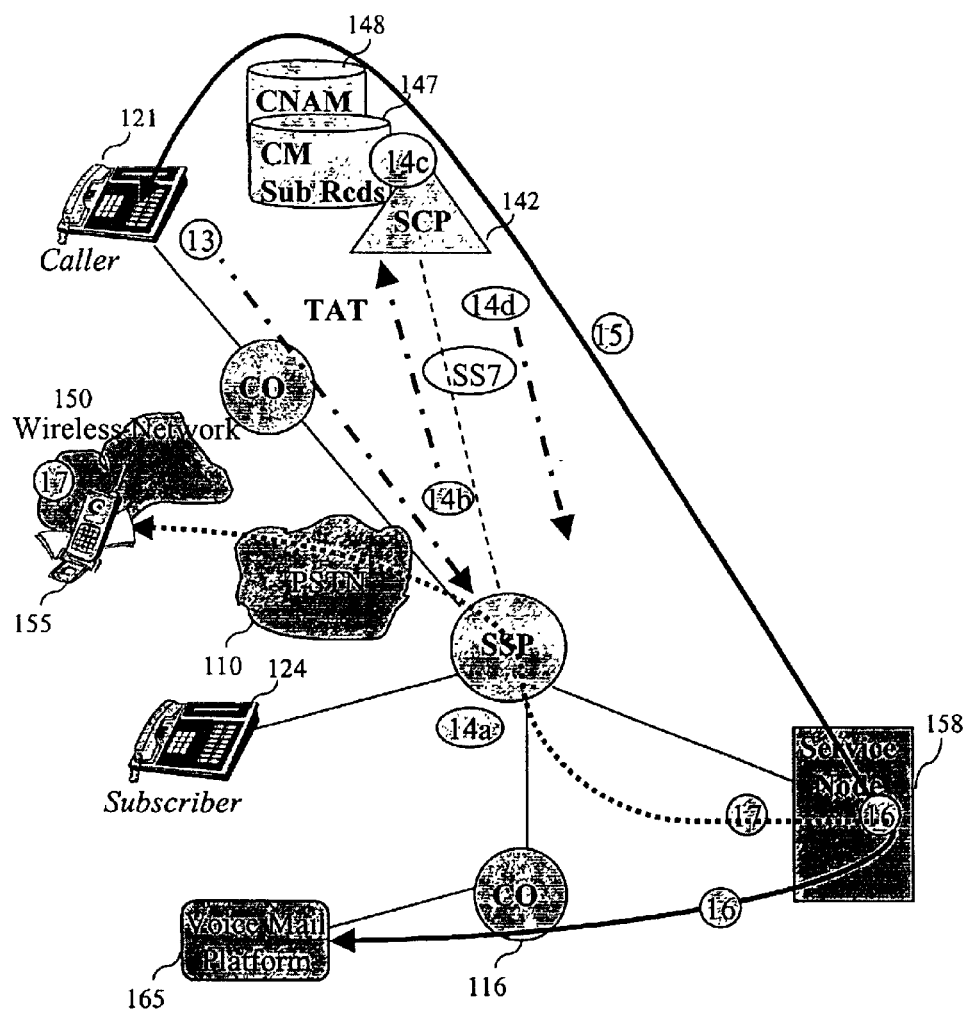

Referring to FIG. 6, a voicemail system 165 is shown being functionally connected to the switch 116 and is a component of the network. That is, calls are routed to and from the voicemail system 165 at the control and direction of the network via such components as the SCP 142. The voicemail system 165 may be connected to the switch 116 via a PRI interface line similar to the connection of the service node 158 to the switch 114. In operation, the voicemail system 165 is treated like a switch 114 whereby calls directed to voicemail boxes maintained at the voicemail system 165 are directed to the voicemail system 165 as calls are directed to customer premises equipment, such as telephones via switches 114.

The voicemail system 165 typically includes a computer or collection of computers, recording and recording playback devices, and software for recording announcements for incoming calls, recording and playing back recorded messages, and for receiving incoming calls and for making outgoing calls at the direction of the network. In addition to the recording and playback functionality, the voicemail system 165 includes text-to-speech (TTS) and speech-to-text (STT) synthesis devices and software for conversion of analog voice messages to digitized forms such as WAV files and MP3 files. The voicemail system 165 has memory capacity for saving announcements to incoming callers and for saving messages from incoming callers.

The wireless network 150, such as a cellular network, comprises a mobile switching center (MSC) (not shown). The MSC is a switch providing services and coordination between wireless users in the network 150 and external networks. The MSC also communicates with a wireless subscriber, such as wireless telephone. The wireless telephone 155 is also illustrative of other wireless computing devices, such as pagers and personal digital assistants.

Referring to FIGS. 1 and 6, in operation, the intelligent network elements of the AIN, as described above, communicate with each other via digital data messages transmitted over the network of digital data links. An SSP may be configured to interface with these network elements through the use of a trigger. A trigger in the network is an event associated with a particular subscriber line or call that causes the SSP to generate a data packet message to be sent to a service control point. In order to keep the processing of data and calls as simple and generic as possible at central office switches, such as SSP switches 114, a relatively small set of triggers are defined at the SSP switches for each call.

The message created by an SSP in response to the "firing" of a trigger is known as a "query" message. A query message opens a "transaction" and the SSP generally holds the communication until it receives a reply from an appropriate network element via the network of digital data links instructing the SSP 112 to take a certain action. If the SSP 112 receives no instructions within a certain amount of time, the SSP "times-out" and executes a default task for the communication. The reply to the query message may be a "conversation" message or a "response" message. Conversation messages allow for bi-directional exchanges between network elements while the transaction remains open. A "response" message closes the transaction opened by the query message, and usually instructs the SSP to route the held communication for connection with a terminating station. Query messages, conversation messages, and response messages are standard types of messages defined by the AIN protocol. The details of the AIN protocol are well known to those skilled in the art and will not be further described herein. For more information regarding the AIN protocol, see Bellcore Specification GR-1298-CORE Switching Systems Generic Requirements for AIN 0.1, which is incorporated herein by reference.

Figure 2:
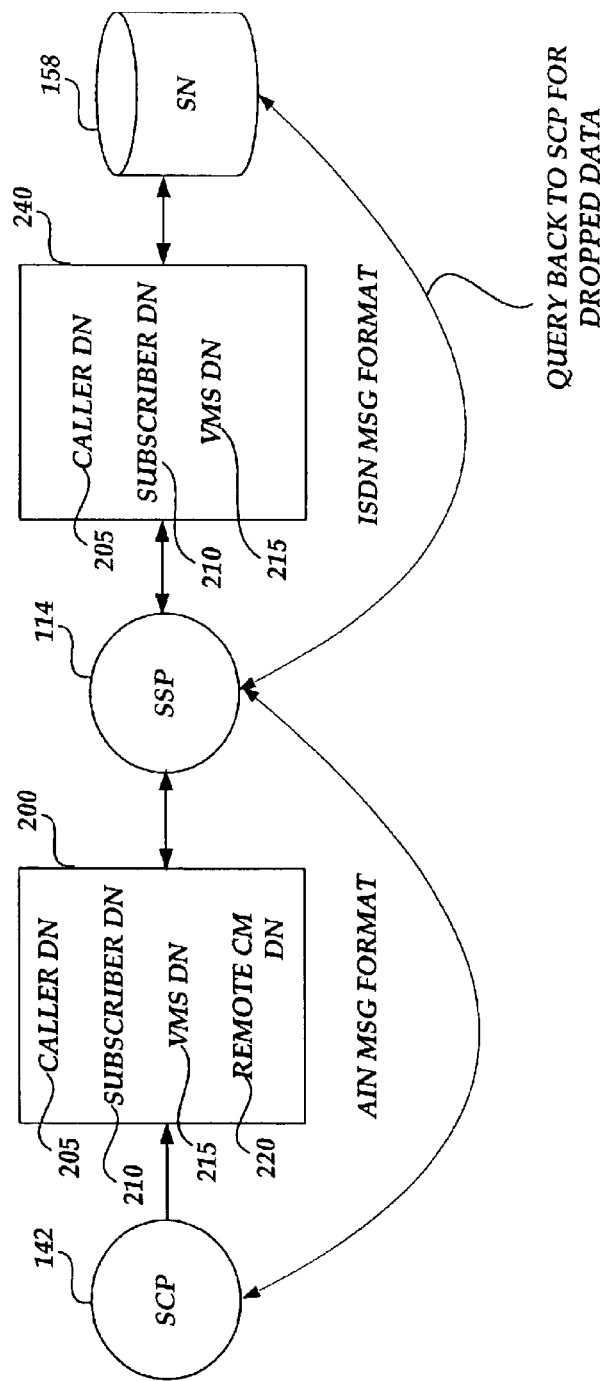
FIG. 2 is a simplified block diagram illustrating a prior art mapping of data from an AIN protocol message to an ISDN protocol message.

FIG. 2 is a simplified block diagram illustrating a prior art mapping of data from an AIN protocol message to an ISDN protocol message. In accordance with an embodiment of the present invention, the service control point 142 illustrated in FIG. 1 obtains all data required for the provision of some specialized service or feature by a second network component, such as the service node 158. Once the service control point 142 gathers all required data, that data is populated into an AIN protocol message 200, illustrated in FIG. 2. The message 200 includes for example, a caller directory number 205, a subscriber directory number 210, a voice mail system directory number 215, and a remote call monitoring directory number 220. As should be understood, the data illustrated in the message 200 is for purposes of example only and are not restrictive of the invention claimed herein. For example, some specialized services such as a service allowing a subscriber to monitor calls directed to a voice mail system may require that the service node 158 have the data illustrated in the message 200 to prepare a three-way communication between a calling party, the voice mail system 165 and the subscriber.

As shown in FIG. 2, according to prior art methods and systems, the switch 114 receives the message 200 from the SCP 142, and the switch 114 must map the data from the AIN protocol message to an ISDN protocol message 240 for transmission to the service node 158. According to the prior art system illustrated in FIG. 2, the switch 114 does not recognize a portion of the data obtained in the message 200, for example the remote call monitoring directory number 220, as being data that may be mapped directly to the ISDN protocol message 240. That is, the ISDN protocol message 240 does not have a data field associated with the remote call monitoring directory number 220 provided by the service control point 142 in the message 200.

According to the prior art system illustrated in FIG. 2, the switch 114 drops the unrecognized data 220 and maps only the recognized data 205, 210, and 215 into the ISDN protocol message 240. The message 240 is then transmitted to the service node 158 for provision of the required service. Once the service node 158 receives the message 240, the service node 158 parses the data contained in the message 240 only to find that a required data item, for example the remote call monitoring directory number 220, has not been provided in the message 240. In order to provide the required service, the service node 158 must call the switch 114 where a trigger is fired launching a query to the service control point 142 requesting the missing data. It should be understood, the service node 158 must continue this process of triggering a query to the service control point 142 until the service node 158 has obtained all the necessary data for providing the required service or feature.

Figure 3:
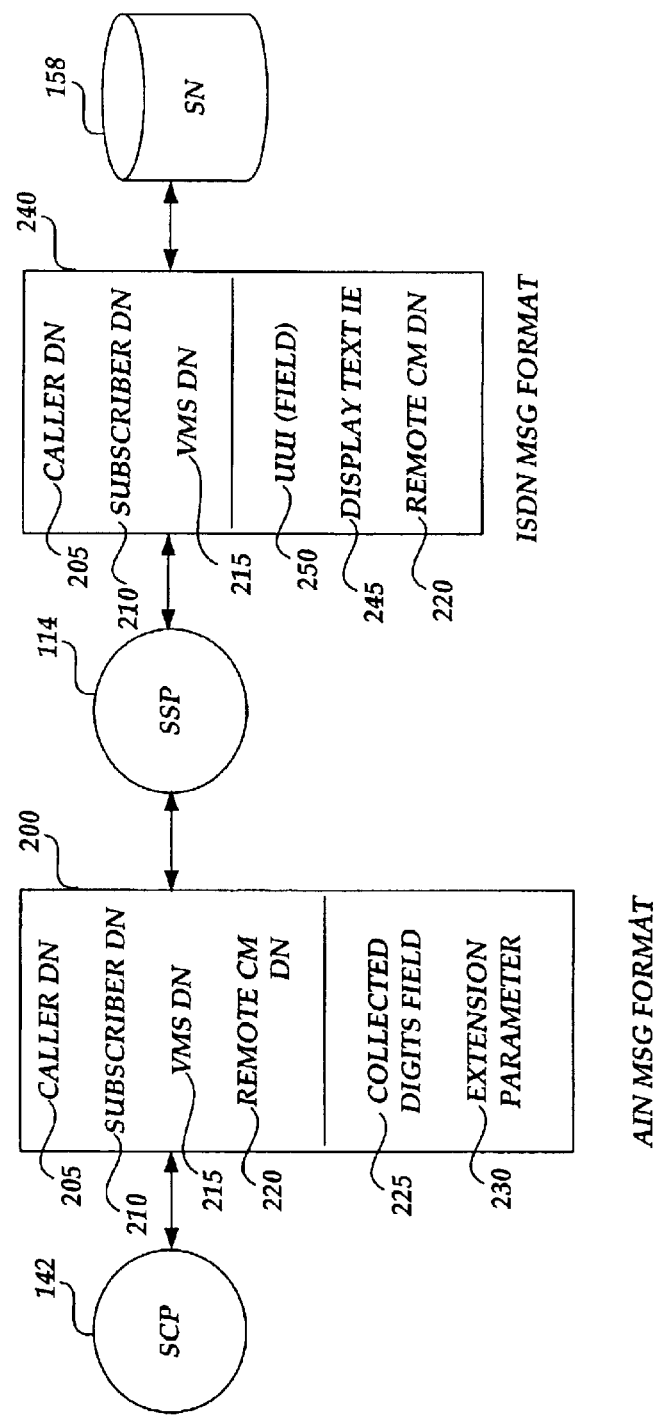
FIG. 3 is a simplified block diagram of a mapping of data between an AIN protocol message and an ISDN protocol message according to embodiments of the present invention.

FIG. 3 is a simplified block diagram of a mapping of data between an AIN protocol message and an ISDN protocol message according to embodiments of the present invention. As shown in FIG. 3, according to an embodiment of the present invention, the switch 114 attempts to place the data 220 from the AIN message 200 into a data field contained in the ISDN protocol message 240. According to the illustrative message 240, shown in FIG. 3, the switch 114 places the data 220, for example a remote call monitoring directory number, into a user—user information field (UUI) 250 contained in the ISDN message 240. As should be understood by those skilled in the art, the use of the UUI field 250 is for purposes of example only and is not restrictive of the invention claimed herein. That is, the ISDN message 240 may contain a number of different data fields that may be used by the switch 114 for mapping data from the AIN message and from which the service node 158 may extract the data. For example, according to an embodiment of the present invention, an exemplary ISDN message format may include data formats such as a user—user information data field, a display field data field, a called party number data field, a calling party data field number, an end-point identifier data field, a feature activation data field, only to name a few.

According to a preferred embodiment, the user—user information data field has a substantial length, for example up to 128 characters, in which data from the AIN message may be inserted for subsequent extraction by the service node 158. The service control point 142 may know in advance data that will not map on a one-to-one basis from the AIN message format 200 to the ISDN message format 240. Accordingly, the SCP 142 may designate in advance the data that will be inserted by the switch 114 into a given field, such as the UUI field 250. The SCP 142 may provide instructions to the service node 158 as to the content of the data that will be inserted into the ISDN message field, the order of the data, and any required instructions for parsing the data for subsequent use. Alternatively, the service node 158 may be populated with instructions for extracting the data from the data field 250 and for parsing the data. For example, if the data inserted in the UUI data field 250 by the switch 114 includes four telephone directory numbers needed by the service noted 158, and each telephone directory number is comprised of ten digits, the service node may be instructed to parse the data contained in the UUI field 250 by selecting the first ten digits of data as the first directory number, followed by the second ten digits as the second directory number, and so on. While the ISDN protocol message 240 does not include a specific data field for each of the telephone directory numbers, for example, the service node 158 in fact receives the required telephone directory numbers for use in providing an associated special service or feature.

According to an alternative embodiment the service node 158 may send information back to the SCP 142 by sending an ISDN message 240 to the switch 114 directed to the SCP 142. As in the reverse case described above, some data populated in the ISDN message 240 may not map directly to corresponding data fields contained in the AIN message 200. According to an embodiment of the present invention, the switch 114 may map data from a given ISDN message 240 data field to a generic or preselected unused data field in the AIN message 240 where otherwise there is no corresponding data field in the AIN message 200 to accept the data. As shown in FIG. 3, a collected digits field 225 and an extension parameter field 230 are illustrated. According to this embodiment, when the switch 114 needs to map data from the ISDN message 240 to the AIN message 200 where no corresponding AIN message data field exists, the switch 114 may be populated with instructions to map certain data from the ISDN message 240 to one of the generic or preselected unused data fields such as the collected digits field 225 or the extension parameter field 230. Once the AIN message 200 is forwarded to the SCP 142 by the switch 114, the SCP 142 may parse the data placed in one of the generic or unused data fields in order to utilize the data for providing services to a subscriber or caller. As described above with reference to the service node 158, the SCP 142 may be populated with instructions for parsing data placed in a generic or unused data field in the AIN message 200 by the switch 114.

Operation

Figure 4:
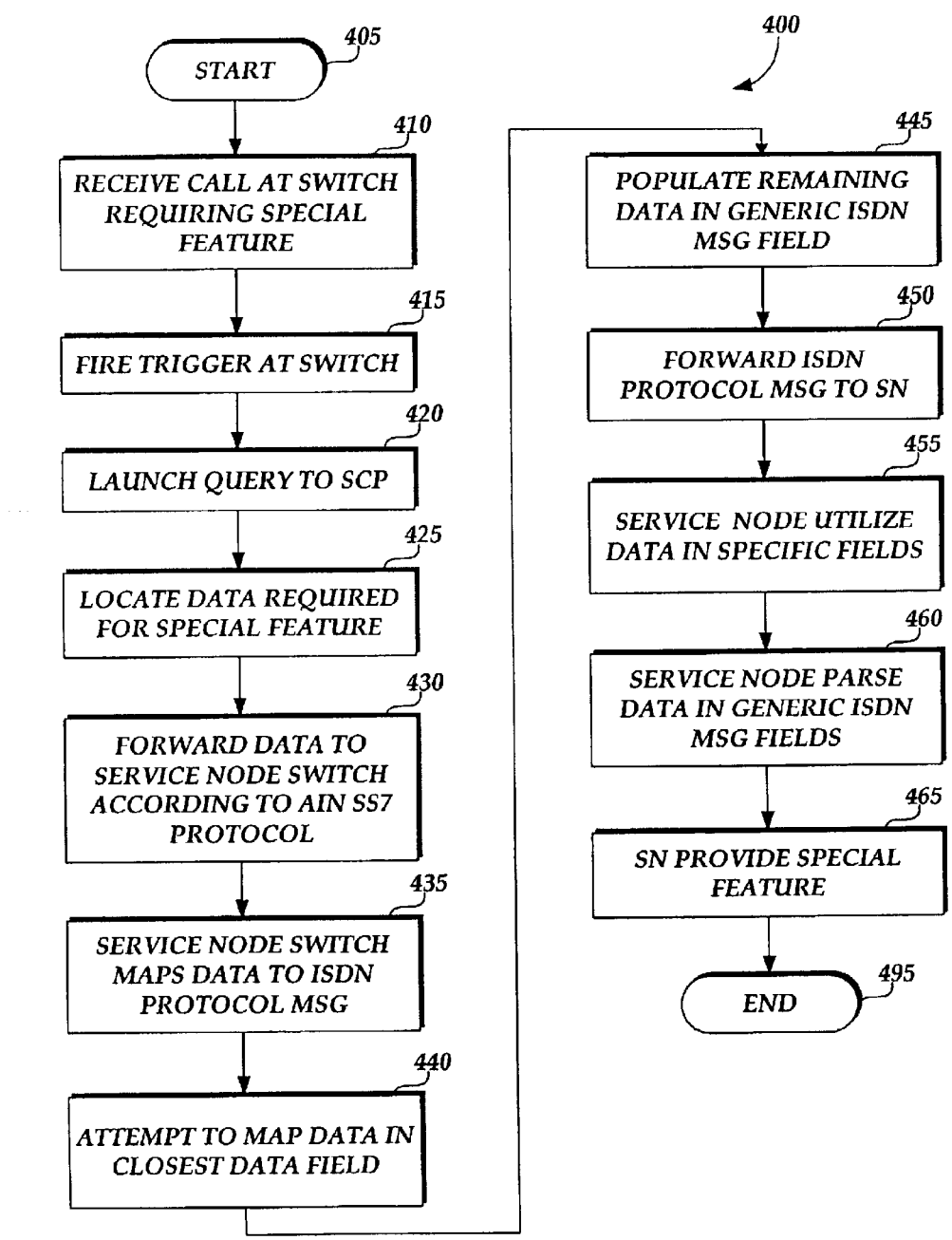
FIG. 4 illustrates a logical flow of the steps performed by a method system of the present invention for mapping data from an AIN protocol message to an ISDN protocol message for use by an intelligent network component.

Having described an operating environment and exemplary AIN and ISDN protocol messages with reference to FIGS. 1, 2, and 3, FIG. 4 illustrates a logical flow of the steps performed by a method system of the present invention for mapping data from an AIN protocol message to an ISDN protocol message for use by an intelligent network component. For purposes of describing FIG. 4, assume for example that a call placed to a calling party requires a special service or feature that must be provided by a service node 158. Referring then to FIG. 4, the method 400 begins at start Step 405 and proceeds to Step 410 where a call from a calling party initiated from the caller's telephone 121 is received at a called party switch 114 directed to the called party at the telephone 124. According to the exemplary steps illustrated in FIG. 4, the call placed by the calling party requires a special service or feature to be provided by the service node 158, such as a Call Return With Calling Name (CRCN) feature. As is known to those skilled in the art, the CRCN feature allows the called party according to this example, to dial a feature code, such as "*69," in order to learn the telephone directory number and name of the last calling party. At Step 415, a trigger at the switch 114 is fired launching a query to the service control point 142 for provision of the special service or feature. A number of different types of triggers may be utilized at the switch 114 including a termination attempt trigger (TAT), a public office dialing plan trigger (PODP), a custom dialing plan trigger (CDP), and the like.

At Step 420, in response to the trigger fired at the switch 114, a query is launched to the SCP 142. At Step 425, the SCP 142 matches the query received from the SSP switch 114 to a database of services and features to determine what service or feature is required in response to the query. At Step 425, the SCP 142 locates all data required, such as a calling party number and a called party number. Also, the SCP 142 may locate a calling name associated with the calling party at the CNAM database 148.

At Step 430, the SCP 142 populates an AIN message 200, as illustrated in FIGS. 2 and 3, with all data required by the service node 158 for providing the service required in association with the call. That is, the message 200 includes each item of data such as a last calling party directory number, a timestamp (of last call), a called party directory number, and a calling party name needed by the service node 158 for a service such as announcing the directory number, calling name and timestamp of the last caller to the subscriber. The AIN message 200 is forwarded to the switch 114 that services the service node 158 in addition to the called party telephone line 120 and telephone 124.

At Step 435, the service node switch 114 maps data from the AIN message 200 to an ISDN message 240. For example a calling party directory number is matched from a calling party number directory field from the AIN message to a calling party directory number field in the ISDN message 240. A called party directory number is mapped from a called party directory number field of the message 200 to a called party directory number field of the message 240. At Step 440, an attempt is made by the switch 114 to map data from the message 200 into the message 240 where a data field in the message 240 is similar to a corresponding data field in the message 200 and where the data field in the message 240 will accommodate the data contained in the corresponding data field in the message 200. For example, the calling party name is matched from a "display text CNAM" data field from the AIN message to the "display text" information element of the message 200. If the data contained in the "display text" field of the message 200 will fit in the "display" field of the message 240, then the data from the "display text" field of the message 200 is inserted into the "display" field of the message 240; otherwise, it can be placed in another "information element" field of the message 240, this decision may be made in advance according to the telephony service requirements.

At Step 445, any remaining data contained in the message 200 from the SCP 142 that does not correspond to a matching data field in the message 240 is inserted by the switch 114 into a previously defined data field contained in the message 240 such as the user—user information (UUI) data field 250 contained in the ISDN message 240. For example, the timestamp of the last call is matched from a "display text DayTimeofday" data field from the AIN message to the "user-to-user information" information element contained in the message 240. As described above, the service node 158 may receive instructions from the SCP 142, or the service node 158 may be populated with instructions as to what to do with data that has been inserted by the switch 114 into a generic data field such as the UUI field 250.

At Step 450, the ISDN message 240 is forwarded from the switch 214 to the service node 158. At Step 455, the service node 158 extracts data from each of the specific data fields contained in the ISDN message 240. At Step 460, the service node 158 parses the data inserted in the generic data field, such as the UUI field 250, as described above with reference to FIG. 3. At Step 465, the service node 158 utilizes the data received from the SCP 142 to provide the specialized service or feature, for example the CRCN feature, as described herein by way of example. Accordingly, the service node 158 is not required to call back to the switch 114 to launch an additional query to the service control point 142 to obtain additional data before the service node 158 can provide the required service or feature. The service node 158 has received all required data for providing the service or feature in one message from the SCP 142 owing to the mapping of all the data from the AIN message 200 over to the ISDN message 240.

EXAMPLES

Figure 5:
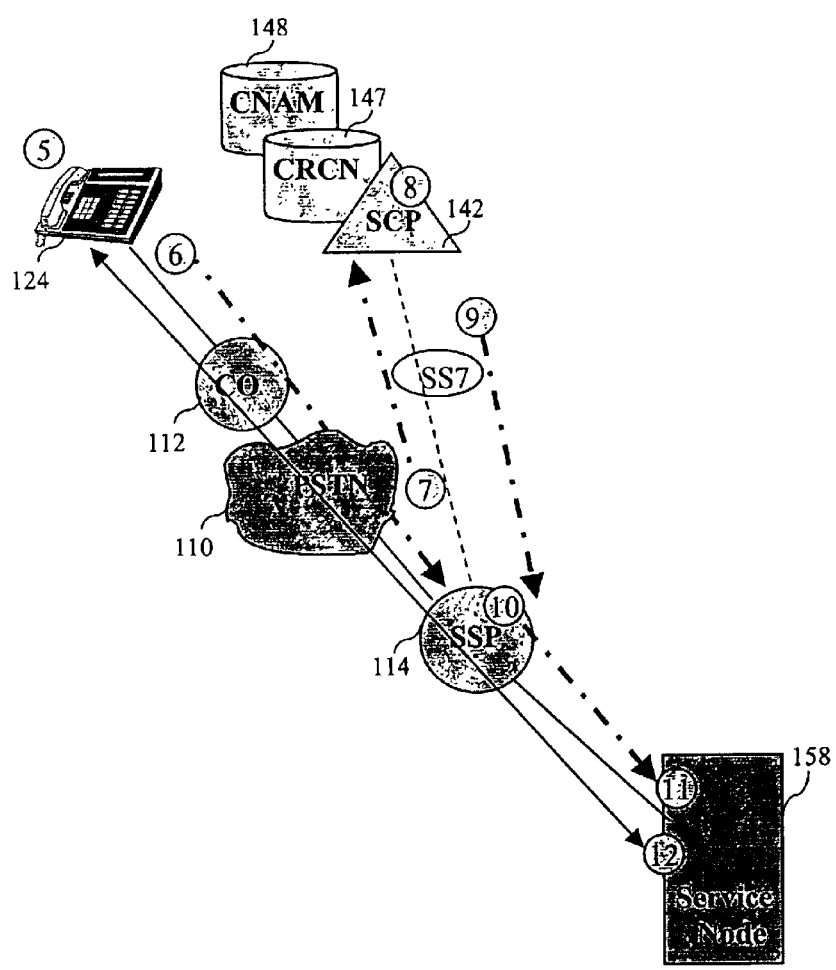
FIGS. 5 and 6 illustrate logical call handling flows utilizing mapping of data from an AIN protocol message to an ISDN protocol message according to the embodiments of the present invention.

FIGS. 5 and 6 illustrate exemplary call flows associated with special services or features provided by a service node 158 based on data and instructions received from a service control point 142 as described above with reference to FIGS. 2 through 4. The discussion of FIGS. 5 and 6 is for purposes of example only and is not restrictive of the invention claimed herein. FIG. 5 illustrates a logical flow in accordance with the present invention for providing a CRCN service. At Step 5 a subscriber from the telephone 124 dials a CRCN directory number that may be a ten digit directory number associated with the service or that may be a feature code such as "*69." According to the example illustrated in FIG. 5, the subscriber has previously received a telephone call and is activating the CRCN service in order to obtain the telephone directory number and name of the last caller to attempt to call the subscriber at the subscriber's telephone 124. At Step 6, the feature code or digits dialed by the subscriber are placed to the service node 158 via the switch 114.

At Step 7, a Public Office Dialing Plan trigger (PODP) or Custom Dialing Plan (CDP) associated with the CRCN feature directory number or access code is fired, and a PODP query is launched to the SCP 142 to obtain the CRCN services requested by the subscriber. At Step 8, the SCP 142 matches the PODP query received from the SSP switch 114 with the CRCN service, and uses the telephone directory number of the subscriber requesting the service to perform a database look up in the CRCN database 147 to obtain the last calling party entry associated with the last call to the subscriber's telephone 124. At Step 9, the SCP 142 populates an AIN message 200 with all data required by the service node 158 for providing the CRCN service to the subscriber. According to the example illustrated in FIG. 5, the SCP 142 populates the AIN message 200 with a display text field including the calling name of the last calling party, for example "John Doe," the calling party directory number associated with the last calling party, and the message 200 is populated with a display text field including the date and time of day of the last call to the subscriber.

The message 200 populated by the SCP 142 is transmitted to the switch 114 by the service control point 142. At Step 10, in accordance with an embodiment of the present invention, the switch 114 maps the data fields contained in the AIN message 200 into an ISDN message for forwarding the data to the service node 158. According to the example illustrated in FIG. 5, the ISDN message 240 populated by the switch 114 is a Q.931 SETUP message. Without the functionality of the present invention, the switch 114 would drop both display text fields, including the last calling party's name and the date and time of the last call. Accordingly, the service node 158 would receive less information than is required to process the CRCN feature. In accordance with the present invention, the switch 114 inserts the display text data, including last calling party's name and the day and time of the last call into the Display Text IE 245 and UUI 250 information elements, respectively, of the ISDN message 240. After the message 240 is populated with all data received from the SCP 142, the switch 114 forwards the ISDN message 240 to the service node 158.

At Step 11, service node 158 receives the ISDN message 240 from the switch 114. The service node 158 extracts data from known data fields such as the calling party directory number data field for use in providing the special feature. Next, the service node 158 extracts the data inserted into the Display Text IE 245 and UUI 250 information elements and parses through the content of the data to separate individual entries such as the date and time of the last call. Utilizing the data received from the service control point 142 via a single ISDN message 240, the service node 158 answers the call placed by the subscriber and coverts the data received in the message 240 from text-to-speech. The SCP 142 then announces the data to the subscriber, including the name of the last calling party, the directory number of the last calling party, and the date and time of the last call to the subscriber. The SCP then disconnects the call from the subscriber.

FIG. 6 illustrates a logical call flow of the steps performed in accordance with the present invention for providing a remote call monitoring service to a subscriber. At Step 13, a caller from a telephone 121 places a call to a subscriber at the subscriber's telephone 124. At Step 14*a*, because the call to the subscriber is not answered or because the call reaches a busy line, the call is designated for forwarding to a voice mail system 165 where the calling party may leave a voice mail message for the subscriber. At Step 14*b*, the forwarded call fires a trigger at the switch 114 causing a public office dialing plan (PODP) query to be launched to the service control point 142 for obtaining remote call monitoring services where by the subscriber may remotely monitor the voice mail message being left by the calling party from a remote location, such as the wireless telephone 155.

At Step 14*c*, the service control point 142 checks the call monitoring subscriber records database 147 for data and instructions associated with the PODP query received from the switch 114. In response to the database lookup, the service control point determines that the query is associated with a remote call monitoring service subscribed to by the subscriber. The service control point retrieves a remote call monitoring directory number associated with the subscriber's wireless telephone 155 and a voice mail system 165 access directory number. At Step 14*d*, the service control point populates an AIN message 200 with the calling party directory number, calling party name, the called party directory number, the voice mail system access directory number, and the remote call monitoring directory number.

The service control point sends the AIN message 200, for example an "analyze route" message, containing the required data to the switch 114 for ultimate forwarding to the service node 158 from which the remote call monitoring service is provided. When the switch 114 receives the AIN message from the SCP 142, the switch 114 maps the data from the AIN message to corresponding data fields in the ISDN message 240. Without the functionality of the present invention, the switch 114 may drop a portion of the data, for example, the remote call monitoring directory number because no corresponding data field exists in the ISDN message 240. In accordance with an embodiment of the present invention, however, the switch 114 maps the remote call monitoring directory number to an available data field, such as the UUI field 250.

The remaining data items, including the calling party number, calling party name, the called party number and the voice mail system access directory number are mapped to appropriately corresponding data fields in the ISDN message 240. According to a preferred embodiment, the ISDN message 240 is a Q.931 SETUP message. After the switch 114 maps all the data from the AIN message 200 over to the ISDN message 240, the ISDN message is forwarded to the service node 158. The service node 158 receives the message 240 and retrieves each item of data from the message 240, including the remote call monitoring directory number from the UUI field 250. As described above, the service node 158 is populated with instructions for parsing the UUI data field 250 in order to retrieve and utilize data inserted therein by the switch 114.

At Step 16, the service node 158 initiates a call between the caller from the caller's telephone 121 and the voice mail system 165. At Step 17, the service node 158 utilizing the remote call monitoring directory number bridges the subscriber into the call to create a three-way communication between the caller, the voice mail system and the subscriber at the subscriber's wireless telephone 155 so that the subscriber may listen only to the voice mail message being left by the caller at the voice mail system 165. The SN may also announce the Calling Party Name before monitoring begins. As should be understood from the foregoing discussion, had the remote call monitoring directory number not been passed to the service node 158 by mapping that data into the UUI field 250 of the ISDN message 240, the service node 158 would have to call the switch 114 to launch a query to the SCP 142 to request that the data be forwarded to the service node 158.

Another example call flow utilizing the functionality of the present invention is a call flow directed to a "follow-me" service. A follow-me service allows a subscriber to provide her telecommunications service provider with a number of alternative telephone directory numbers at which the subscriber may be reached at any given time. For example, the subscriber may provide a service provider with a first directory number for her home number, a second directory number for her business number, a third directory number for her wireless telephone, etc. According to a follow-me feature, each time a subscriber receives a telephone call, the first provided number rings first for a set number of rings. If the subscriber does not answer the call after the set number of rings, the call automatically rolls over to the second telephone directory number for a set number of rings. If the subscriber does not answer the telephone at the second number after a set number of rings, the call rolls over to the third telephone directory number and so on.

In order to provide such a follow-me feature, the service node 158 requires various data for setting up and providing the feature. For example, in addition to other types of data, the service node 158 requires each telephone directory number to which the subscriber would like incoming calls to be directed sequentially, as described above. In accordance with the present invention, when the subscriber receives a telephone call, a Termination Attempt Trigger (TAT) is fired at the subscriber's switch causing a query to the SCP 142. The SCP 142 matches the query from the subscriber's switch with the follow-me feature, and the SCP 142 retrieves all data required for executing the feature including the alternate telephone directory numbers provided by the subscriber.

The SCP 142 populates an AIN message 200 with all the required data and forwards the message to the switch 114. The switch 114 maps the data from the AIN message 200 over to an ISDN message 240 for provision to the service node 158. Without the functionality of the present invention, the switch 114 will recognize that the alternate telephone directory numbers provided by the SCP 142 for provision of the follow-me service do not map directly to corresponding data fields in the ISDN message 240. Accordingly, the switch 114 may drop or ignore altogether those alternate telephone directory numbers. According to the functionality of the present invention, however, the switch 114 may populate an unused data field in the ISDN message 240, such as the UUI field 250. When the SCP 114 forwards the ISDN message 240 to the service node 158, the service node 158 may parse the data populated in the UUI field 250 in order to retrieve the alternate telephone directory numbers required for execution of the follow-me feature.

As described above, the SCP 142 may be programmed to send the alternate telephone directory numbers in a prescribed order, and the service node 158 may be likewise programmed to parse the data contained in the UUI field 250 in order to obtain the directory numbers. That is, the service node 158 may be programmed to take the first ten digits from the UUI field 250 as the first directory number, the second ten digits as the first alternate directory number, the third ten digits in the UUI field 250 as the second alternate directory number, and so on. Thus, the service node 158 obtains all required data for executing the follow-me feature without the need for sequentially triggering queries to the SCP 142 for each data item required by the service node 158.

As described above with reference to FIG. 3, the functionality of the present invention may be utilized to map data from an ISDN message 240 over to an AIN message 200 when data must be forwarded from a service node 158 to an SCP 142 via a switch 114. For example, certain services provided to subscribers of telecommunications services require subscribers to call a telecommunications service provider and set up various administrative information required for provision of a given service. For example, a subscriber may be required to enter a passcode associated with a subscriber telephone directory number so that the subscriber may utilize a given service in the future. According to the following example, after the subscriber calls her telecommunications service provider, the subscriber's call is directed to a service node 158 where the service node 158 prompts the subscriber for subscriber data such as "please enter your passcode followed by the pound sign, and please enter your telephone directory number followed by the pound sign." Once the service node 158 obtains the required data from the subscriber, the required data must be forwarded to the SCP 142 to populate a subscriber database for future use by the telecommunications service provider.

The service node 158 populates an ISDN message 240 for transmission to the service control point 142. The ISDN message 240 is received by the switch 114 which in turn must populate an AIN message 200 with the data from the ISDN message 240 for transmission to the SCP 142. Because the AIN message 200 does not have a data field corresponding to the passcode received from the subscriber, the switch 114 populates the passcode data from the ISDN message 240 into a generic or preselected unused data field of the AIN message 200. For example, the passcode data from the ISDN message 240 may be populated into the collected digits data field 225 of the AIN message 200.

Once the AIN message 200 is prepared by the switch 114, the message is forwarded to the SCP 142. The SCP 142 parses each data field of the AIN message 200 to obtain data contained therein. When the SCP 142 parses the data contained in the collected digits data field 225, the SCP 142 parses that data in accordance with a set of predefined rules for parsing data placed in that data field by the switch 114. For example, the SCP 142 may be instructed to take the first five alpha-numeric characters contained in the collected digits data field 225 as a passcode provided by the a subscriber. Without use of the functionality of the present invention, the switch 114 may drop or ignore altogether the passcode data contained in the ISDN message 240. Consequently, the SCP 142 would not receive the passcode data from the service node 158 and the SCP 142 would be required to request that information from the service node 158 via a subsequent data transmission.

As described herein, methods and systems are provided for mapping data between an advanced intelligent network (AIN) protocol message and an integrated services digital network (ISDN) protocol message for use by an intelligent peripheral telecommunications system component. It will be apparent to those skilled in the art that various modifications and variations may be made in the present invention without departing from the scope or spirit of the invention. Other embodiments of the invention will be apparent to those skilled in the art from consideration of the specification and practice of the invention described herein.

We claim:

1. In an advanced intelligent network a method of routing data from a first network element to a second network element for providing a service from the second network element, comprising the steps of:

receiving a call at a switch;

firing a trigger at the switch;

in response to firing the trigger, launching a query to the first network element for providing a call handling service required by the call;

at the first network element, populating a first message with data required for providing the call handling service, and populating the data according to a first message format;

routing the first message to a switch associated with the second network element;

at the switch associated with the second network element, populating a second message with the data from the first message according to a second message format;

if any data from any data field of the first message does not correspond to a matching data field of the second message, selecting a data field of the second message for populating with any data that does not correspond to a matching data field of the second message;

populating the selected data field of the second message with any data of the first message that does not correspond to a matching data field of the second message; and routing the second message to the second network element for using the data for providing the call handling service.

2. The method of claim 1, further comprising the steps of:

at the second network element, extracting the data from each data field of the second message for providing the call handling service; and parsing the data extracted from the selected data field according to a set of instructions to determine an identification of the data populated in the selected data field.

3. The method of claim 2, further comprising the step of:

providing the second network element the set of instructions for parsing the data extracted from the selected data field to identify any particular portions of the data populated into the selected data field.

4. The method of claim 3, further comprising the step of:

providing the first network element a set of instructions for populating the first message with any particular portions of the data that do not correspond to a matching data field in the second message so that the particular portions of the data are populated into the selected data field in a sequence that may be parsed by the second network element according to the set of instructions for parsing the data.

5. The method of claim 2, further comprising the step of using the identified data populated in the selected data field for providing the call handling service.

6. The method of claim 1, whereby the step of populating a first message according to a first message format includes the step of populating the first message according to an Advanced Intelligent Network (AIN) message protocol.

7. The method of claim 6, whereby the step of populating the first message according to an AIN protocol includes populating the message according to a Transaction Capabilities Part (TCAP) protocol.

8. The method of claim 6, whereby the step of populating a second message with the data from the first message according to a second message format includes populating the second message according to an Integrated Services Digital Network (ISDN) message protocol.

9. The method of claim 8, whereby the step of populating a second message with the data from the first message according to a second message format includes mapping data from data fields of the first message to corresponding data fields of the second message.

10. The method of claim 1, prior to the step of selecting a data field of the second message for populating with any data that does not correspond to a matching data field of the second message includes determining whether any data from any data field of the first message does not correspond to a matching data field of the second message.

11. The method of claim 1, whereby the step of populating the selected data field of the second message with the any data of the first message that does not correspond to a matching data field of the second message includes populating a User—User Information (UUI) data field of the second message.

12. The method of claim 11, whereby the UUI data field is a data field of the ISDN protocol.

13. The method of claim 1, prior to the step of populating a first message with data required for providing the call handling service further comprises the steps of:

at the first network element, matching the query to data required for providing the call handling service; and retrieving the data required for providing the call handling service.

14. The method of claim 13, whereby the first network element is a service control point.

15. The method of claim 14, whereby the second network element is a service node.

16. The method of claim 1, whereby the step of firing a trigger at the switch includes firing a Termination Attempt Trigger (TAT).

17. The method of claim 1, whereby the step of firing a trigger at the switch includes firing a Public Office Dialing Plan (PODP).

18. The method of claim 1, whereby the step of firing a trigger at the switch includes firing a Custom Dialing Plan (CDP).

19. In an advanced intelligent network a method of routing data from a first network element to a second network element for providing a service from the second network element comprising the steps of:

at a service control point, populating an Advanced Intelligent Network (AIN) message with data required for providing a call handling service, and populating the data according to an AIN protocol format;

routing the AIN message to a switch associated with a service node;

at the switch associated with the service node, populating an Integrated Services Digital Network (ISDN) message with the data from the AIN message according to an ISDN protocol format;

if any data from any data field of the AIN message does not correspond to a matching data field of the ISDN message, selecting a data field of the ISDN message for populating with any data that does not correspond to a matching data field of the ISDN message;

populating the selected data field of the ISDN message with any data of the AIN message that does not correspond to a matching data field of the ISDN message;

routing the ISDN message to the service node;

at the service node, extracting the data from each data field of the ISDN message for providing the call handling service; and parsing the data extracted from the selected data field according to a set of instructions to determine an identification of the data populated in the selected data field for using the data for providing the call handling service.

20. The method of claim 19, further comprising the step of:

providing the service control point a set of instructions for populating the AIN message with any particular portions of the data that do not correspond to a matching data field in the ISDN message so that the particular portions of the data are populated into the selected data field in a sequence that may be parsed by the service node according to the set of instructions for parsing the data.

21. The method of claim 20, whereby the step of populating the selected data field of the ISDN message with any data of the AIN message that does not correspond to a matching data field of the ISDN message includes populating a User—User Information (UUI) data field of the ISDN message.

22. A method of mapping data between an advanced intelligent network (AIN) protocol message and an integrated services digital network (ISDN) protocol message for use by intelligent telecommunications system components, comprising the steps of:

at a first network element, populating a first message with data required for providing a service, and populating the data according to a first message format;

routing the first message to a switch;

at the switch, populating a second message with the data from the first message according to a second message format;

if any data from any data field of the first message does not correspond to a matching data field of the second message, selecting a data field of the second message for populating with any data that does not correspond to a matching data field of the second message;

populating the selected data field of the second message with any data of the first message that does not correspond to a matching data field of the second message; and routing the second message to a second network element for using the data for providing the service.

23. The method of claim 22, further comprising the steps of:

at the second network element, extracting the data from each data field of the second message for providing the service; and parsing the data extracted from the selected data field according to a set of instructions to determine an identification of the data populated in the selected data field.

24. The method of claim 23, whereby the step of populating a first message according to a first message format includes the step of populating the first message according to an Advanced Intelligent Network (AIN) message protocol; and whereby the step of populating a second message with the data from the first message according to a second message format includes populating the second message according to an Integrated Services Digital Network (ISDN) message protocol.

25. The method of claim 23, whereby the step of populating a first message according to a first message format includes the step of populating the first message according to an Integrated Services Digital Network (ISDN) message protocol; and whereby the step of populating a second message with the data from the first message according to a second message format includes the step of populating the second message according to an Advanced Intelligent Network (AIN) message protocol.

26. A system for mapping data between an advanced intelligent network (AIN) protocol message and an integrated services digital network (ISDN) protocol message for use by intelligent telecommunications system components, comprising:

a first network element operative
to populate a first message with data required for providing a service, and populating the data according to a first message format;
to route the first message to a switch;

the switch operative
to populate a second message with the data from the first message according to a second message format;
to select a data field of the second message for populating with any data that does not correspond to a matching data field of the second message if any data from any data field of the first message does not correspond to a matching data field of the second message;
to populate the selected data field of the second message with any data of the first message that does not correspond to a matching data field of the second message; and
to route the second message to a second network element for using the data for providing the service.

27. The system of claim 26, further comprising:

the second network element operative
to extract the data from each data field of the second message for providing the service; and
to parse the data extracted from the selected data field according to a set of instructions to determine an identification of the data populated in the selected data field.

28. The system of claim 27, whereby the first network element is further operative to populate the first message according to an Advanced Intelligent Network (AIN) message protocol; and whereby the switch is further operative to populate the second message according to an Intergrated Services Digital Network (ISDN) message protocol.

29. The system of claim 27, whereby the first network element is further operative to populate the first message according to an Integrated Services Digital Network (ISDN) message protocol; and whereby the switch is further operative to populate the second message according to an Advanced Intelligent Network (AIN) message protocol.

30. In an advanced intelligent network a method of routing data from a first network element to a second network element for providing a Call Return Calling Name service from the second network element, comprising the steps of:

receiving a call at a switch requesting the Call Return Calling Name service;

firing a trigger at the switch;

in response to firing the trigger, launching a query to a service control point for providing the Call Return Calling Name service;

at the service control point, populating a first message with data required for providing the Call Return Calling Name service, and populating the data according to an Advanced Intelligent Network (AIN) message protocol format;

routing the first message to a switch associated with a service node;

at the switch associated with the service node, populating a second message with the data from the first message according to an Integrated Services Digital Network (ISDN) message protocol;

if any data from any data field of the first message does not correspond to a matching data field of the second message, selecting a data field of the second message for populating with any data that does not correspond to a matching data field of the second message;

populating the selected data field of the second message with any data of the first message that does not correspond to a matching data field of the second message; and routing the second message to the service node for using the data for providing the Call Return Calling Name service.

31. The method of claim 30, whereby the step of populating a first message with data required for providing the Call Return Calling Name service includes:

populating the first message with a calling party name of a last calling party to a subscriber of the Call Return Calling Name service;

populating the first message with a calling party directory number of the last calling party to the subscriber of the Call Return Calling Name service; and populating the first message with a date and time of a call associated with the last calling party to the subscriber of the Call Return Calling Name service.

32. The method of claim 31, whereby the step of populating the selected data field of the second message with any data of the first message that does not correspond to a matching data field of the second message includes:

populating a first selected data field with the calling party name of a last calling party; and populating a second selected data field with the date and time of a call associated with the last calling party.

33. The method of claim 32, whereby the first selected data field is an ISDN message display text field; and the second selected data field is an ISDN message user—user information field.

34. The method of claim 33, further comprising the steps of:

at the service node, extracting the data from each data field of the second message for providing the Call Return Calling Name service; and parsing the data extracted from the first and second selected data fields according to a set of instructions to determine an identification of the data populated in the first and second selected data fields.

35. The method of claim 34, further comprising the step of using the identified data populated in the second message including the data populated in the first and second selected data fields for providing the subscriber the calling party name of a last calling party to a subscriber, the calling party directory number of the last calling party to the subscriber, and a date and time of a call associated with the last calling party to the subscriber.

36. In an advanced intelligent network a method of routing data from a first network element to a second network element for providing a service whereby an incoming call to a subscriber follows the subscriber to prescribed alternative telephone directory numbers, comprising the steps of:

receiving a call at a switch directed to a subscriber;

firing a trigger at the switch;

in response to firing the trigger, launching a query to a service control point for providing the service;

at the service control point, populating a first message according to an Advanced Intelligent Network (AIN) message protocol format with all data required for providing the service, including a plurality of alternative directory numbers at which the subscriber may be reached;

routing the first message to a switch associated with a service node;

at the switch associated with the service node, populating a second message with the data from the first message according to an Integrated Services Digital Network (ISDN) message protocol;

if any data from any data field of the first message does not correspond to a matching data field of the second message, selecting a data field of the second message for populating with any data that does not correspond to a matching data field of the second message;

populating the selected data field of the second message with any data of the first message that does not correspond to a matching data field of the second message; and routing the second message to the service node for using the data for providing the service.

37. The method of claim 36, whereby the step of populating the selected data field of the second message with any data of the first message that does not correspond to a matching data field of the second message includes:

populating the selected data field with the plurality of alternative directory numbers at which the subscriber may be reached.

38. The method of claim 37, whereby the selected data field is an ISDN message user—user information field.

39. The method of claim 37, further comprising the steps of:

at the service node, extracting the data from each data field of the second message for providing the service; and parsing the data extracted from the selected data field according to a set of instructions to identify each of the plurality of alternative directory numbers.

40. The method of claim 39, further comprising the step of using the identified alternative directory numbers to place successive calls to the subscriber at each of the alternative directory numbers until the subscriber is reached.

* * * * *